United States Patent
Chuang

(10) Patent No.: US 6,332,513 B1
(45) Date of Patent: Dec. 25, 2001

(54) SAFETY WHEEL OF A BABY'S WHEELED CHAIR

(75) Inventor: A-Chueh Chuang, Tainan (TW)

(73) Assignee: Jin Sun Gee Plastics Co., Ltd., Tainan (TW)

( * ) Notice: Subject to any disclaimer, the term of this patent is extended or adjusted under 35 U.S.C. 154(b) by 0 days.

(21) Appl. No.: 09/657,170

(22) Filed: Sep. 7, 2000

(51) Int. Cl.[7] ................................................. B60B 33/00
(52) U.S. Cl. ...................................... 188/1.12; 188/82.84
(58) Field of Search ............................. 188/82.84, 82.8, 188/184, 185, 189, 181 R, 181 A, 181 C, 82.1–82.34; 280/87.05, 87.051

(56) References Cited

U.S. PATENT DOCUMENTS

| | | | |
|---|---|---|---|
| 1,459,394 | * | 6/1923 | Gent ................................. 188/82.84 |
| 2,824,625 | * | 2/1958 | Rice, Jr. ............................ 188/82.84 |
| 6,070,701 | * | 6/2000 | Hu ..................................... 188/1.12 |
| 6,076,839 | * | 6/2000 | Pao-Hung ....................... 280/87.051 |

\* cited by examiner

Primary Examiner—Matthew C. Graham
(74) Attorney, Agent, or Firm—Rosenberg, Klein & Lee

(57) ABSTRACT

A safety wheel of a baby's wheeled chair has a support member, a right wheel part, a left wheel part, a ball and a side cover. The support member is connected to a lower side of the wheeled chair. The right wheel part is turnably connected to the support member. The left wheel part is connected to the right wheel part, and has an elongated confining trench. The side cover is connected to the support member adjacent to the left wheel part with the ball confined within the trench and the side cover. The ball can move to a lower end portion of the confining trench due to gravity for same to be stopped by a stopping part of the side cover when the wheel rolls in a first direction, and not to be stopped by the stopping part when the wheel rolls in an opposite direction.

2 Claims, 6 Drawing Sheets

SAFETY WHEEL OF A BABY'S WHEELED CHAIR

BACKGROUND OF THE INVENTION

The present invention relates to a safety wheel of a baby's wheeled chair for a baby to sit on and move around to learn to walk.

Referring to FIGS. 8 and 9, a conventional safety wheel of a baby's wheeled chair has a wheel part 6, a ball 4, and a confining block 7; the wheel part 6 has a recess 61; the confining block 7 is connected to the wheel part 6 with an arc trench 62 being formed between the block 7 and the wheel part 6. The ball 4 is confined in the arc trench 62; the arc trench 62 has an intermediate lower portion wider than the tell 4, and tapers towards two upper end portions, which are narrower than the ball 4.

In moving the baby's wheeled chair slowly, the ball 4 will roll in the lower portion of the arc trench 62, permitting the wheeled chair to continue moving.

When the baby's wheeled chair is moved very quickly, the ball 4 will move to, and engage, the upper portions of the arc trench 62 due to centrifugal force, stopping the wheeled chair from moving.

The ball 4 and the arc trench 62 can stop the wheeled chair when the chair moves too fast, and therefore protect the baby riding on the chair. However, it is found that the safety wheel has an disadvantage that the wheeled chair can't be stopped to protect the baby from hitting obstacles accidentally when it is moved backwards.

SUMMARY OF THE INVENTION

Therefore, it is a main object of the present invention to provide a safety wheel for a baby's wheeled chair which can stop the wheeled chair from moving backwards.

The safety wheel of a baby's wheeled chair of the present invention has:

A support member connected to a bottom side of the wheeled chair;

A right wheel part turnably connected to the support member;

A left wheel part connected to the right wheel part; the left wheel has an elongated confining trench;

A ball movably received in the elongated confining trench;

A side cover connected to the support member; the side cover has a round recess and a stopping part in the round recess; the round recess faces the left wheel part; the ball is confined in the elongated trench and the round recess; the ball can move to a lower end portion of the confining trench due to gravity for same to be stopped by the stopping part of the side cover when the wheel rolls in a first direction, and not to be stopped by the stopping part when the wheel rolls in an opposite direction.

BRIEF DESCRIPTION OF THE DRAWINGS

This invention will be better understood by referring to the accompanying drawings, wherein.

DETAILED DESCRIPTION OF THE PREFERRED EMBODIMENTS

Figure 1:
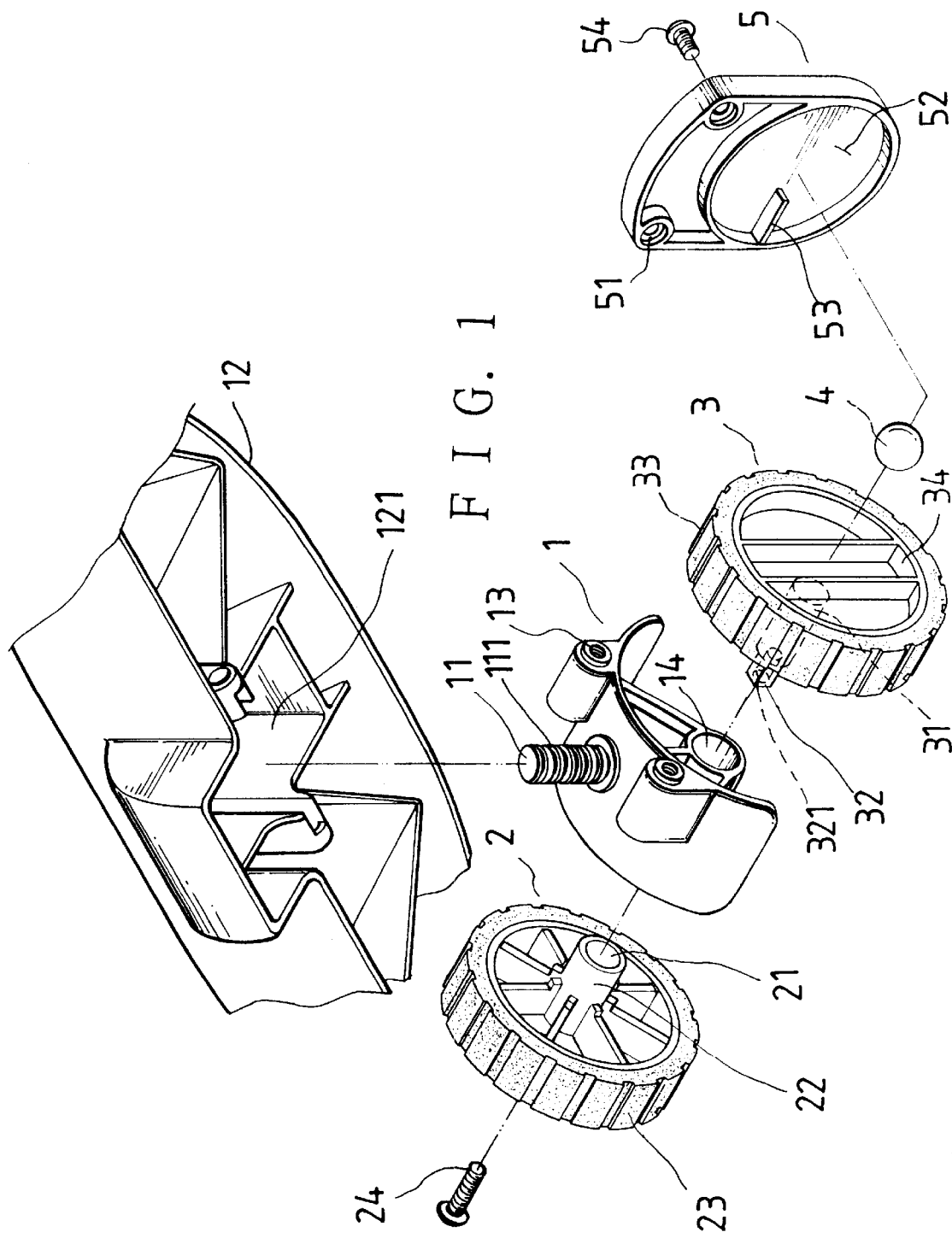
FIG. 1 is an exploded perspective view of a safety wheel of a baby's wheeled chair according to the present invention.

Referring to FIG. 1, a safety wheel of a baby's wheeled chair of the present invention has a support member 1, a right wheel part 2, a left wheel part 3, a ball 4 and a side cover 5.

The support member 1 has a connecting rim 11 on an upper side, screw holes 13 and a sound hole 14. The connecting rim 11 of the support member 1 is connected to a lower side of a wheeled chair 12; the upper part of the support member 1 is received within a receiving room 121 of the wheeled chair 12.

The right wheel part 2 has a tread design 23 and central hollow cylinder 22; the hollow cylinder 22 has a round hole 21. The hollow cylinder 22 of the right wheel 2 is movably passed into the round hole 14 of the support member 1.

Figure 2:
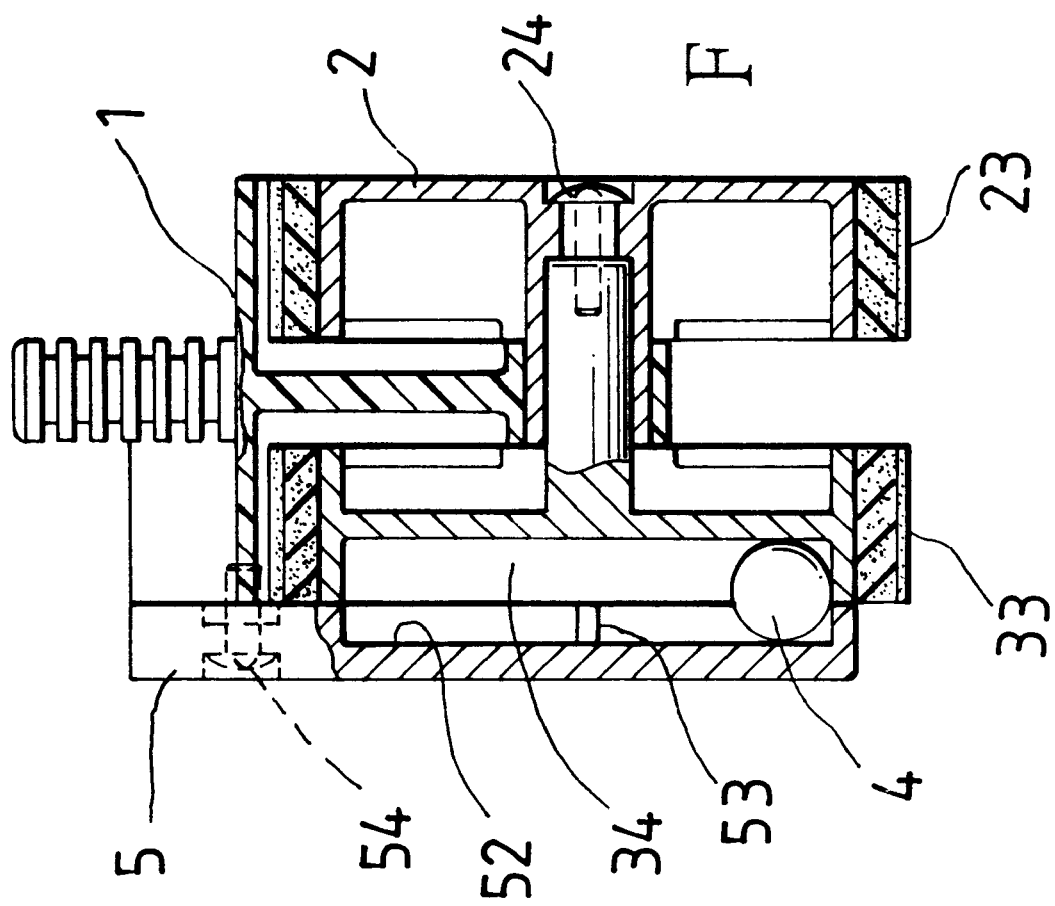
FIG. 2 is a cross-sectional view of the safety wheel of a baby's wheeled chair according to the present invention.
Figure 3:
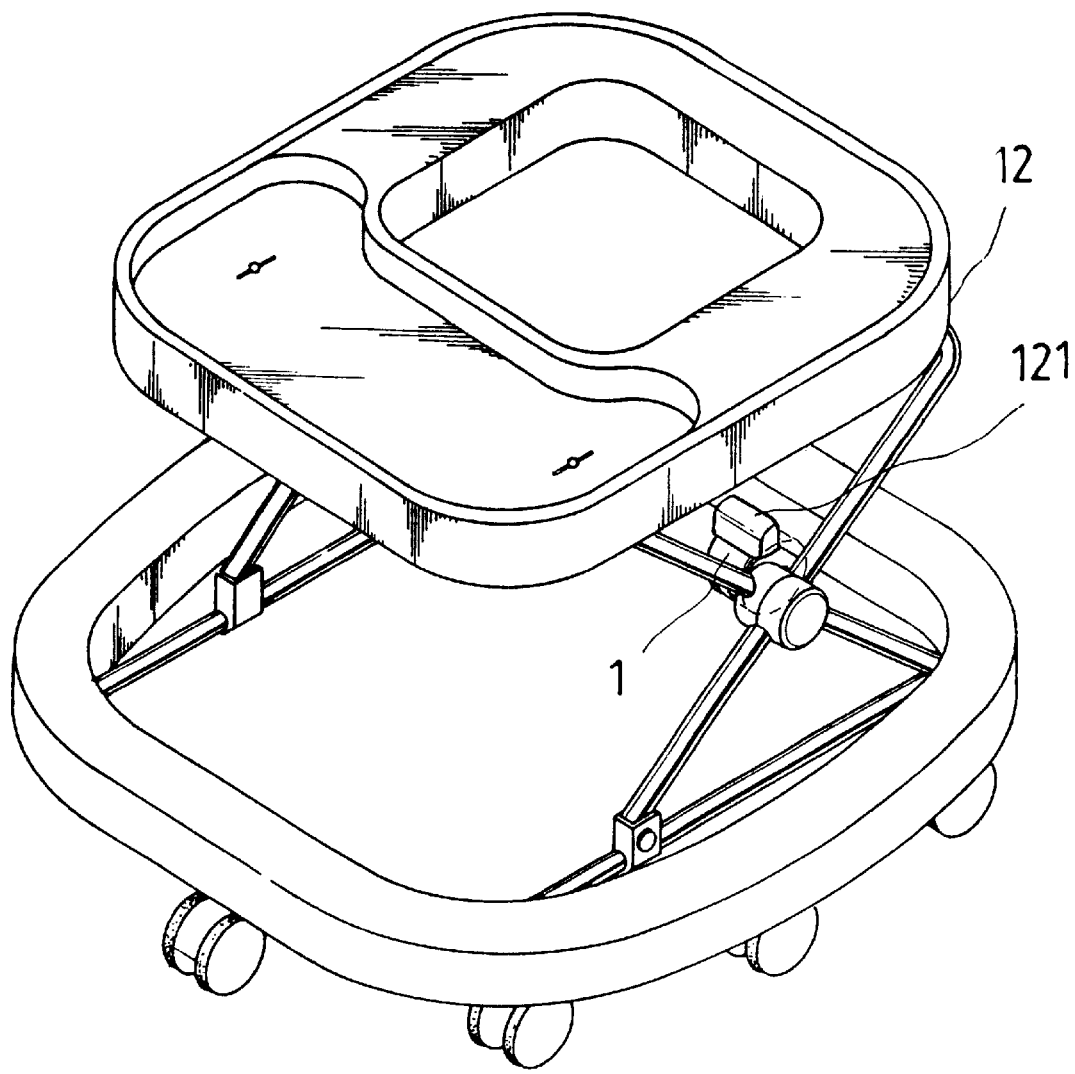
FIG. 3 is a baby's wheeled chair with the safety wheel of the present invention.

The left wheel part 3 has a tread design 33, a central hollow cylinder 31 on an inner side, and an elongated confining trench 34 across the left wheel part 3 on an outer side. A rectangular rod 32 projects on the hollow cylinder 31; the rectangular rod 32 has a screw hole 321. The rectangular rod 32 and the hollow cylinder 31 are passed into the round hole 21 of the right wheel 2 with the rectangular rod 32 being fixedly connected to an outer end of the hollow cylinder 22(see FIG. 2); a screw 24 is screwed into the screw hole 321 from the outer end of the hollow cylinder 22 to connect the wheel parts 2 and 3.

Both the wheel parts 2 and 3 have outer sides made of rubber.

The ball 4 is movably disposed in the elongated confining trench 34.

The side cover 5 has a round recess 52, a stopping part 53 in the round recess 52 and holes 51. The side cover 5 is connected to the support member 1 from the outer side of the left wheel parts 3 with the ball 4 being confined within the round recess 52 and the elongated confining trench 34; screws 54 being screwed into the holes 51 of the side cover 5 and the screw holes 13 of the support member 1.

Figure 4:
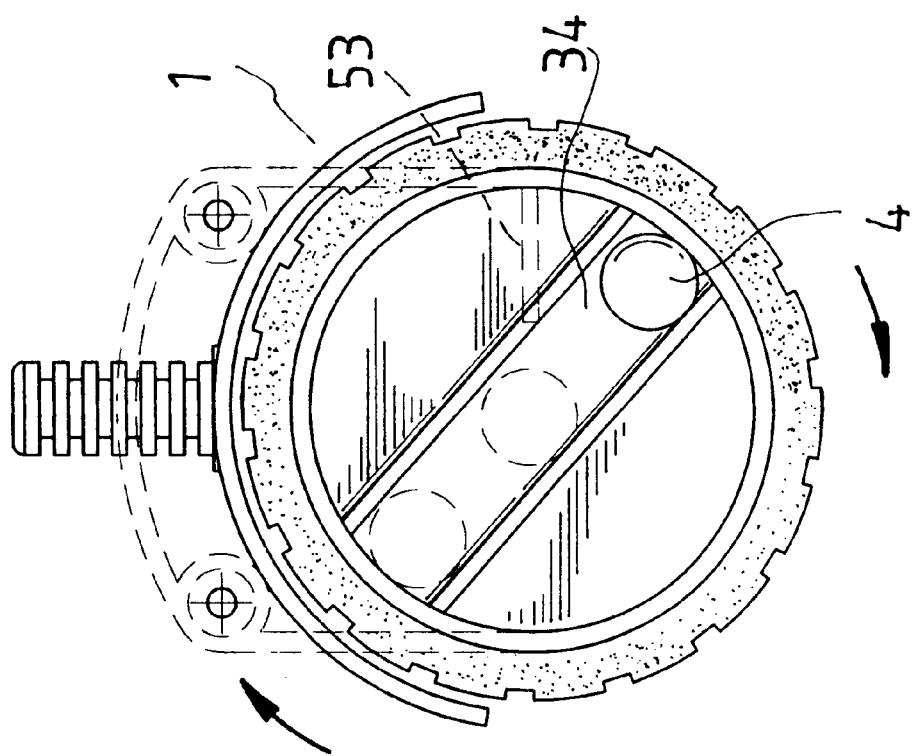
FIG. 4 is a view of the safety wheel of the present invention in forward rolling at ordinary speed.
Figure 5:
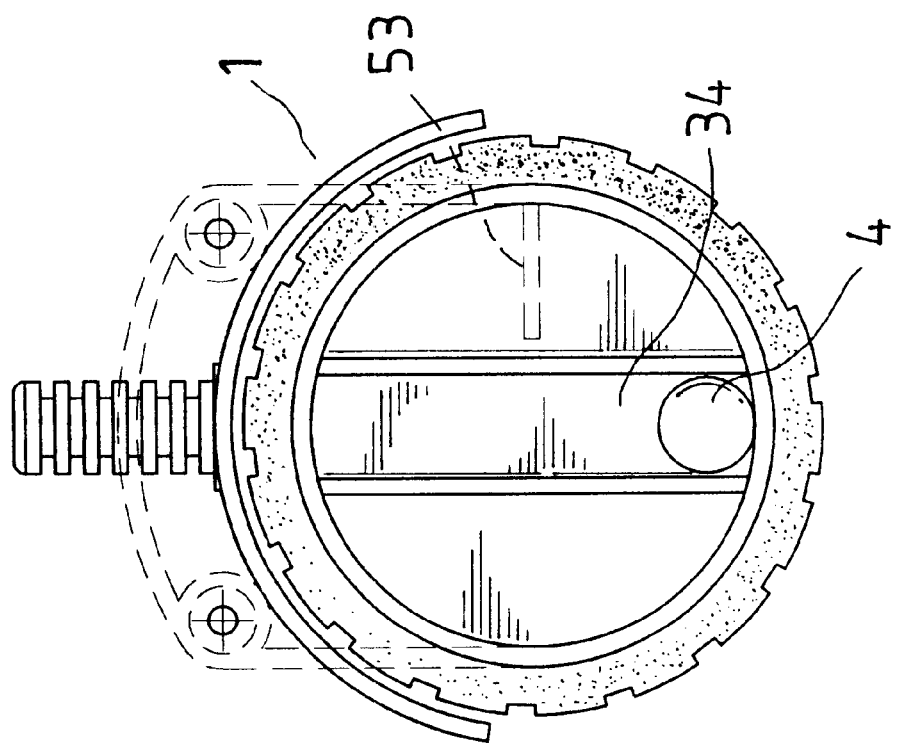
FIG. 5 is another view of the safety wheel of the present invention in forward rolling at ordinary speed.

Referring to FIGS. 4 and 5, when the wheel parts 2 and 3 roll forwards at an ordinary speed, and the elongated trench 34 changes position due to the rolling, the roll 4 will move to a lower end portion of the elongated trench due to gravity. Thus, the ball 4 can't contact the stopping part 53 of the side cover 5 when the wheel parts 2 and 3 roll forwards, i.e. the wheel can continue rolling.

Figure 6:
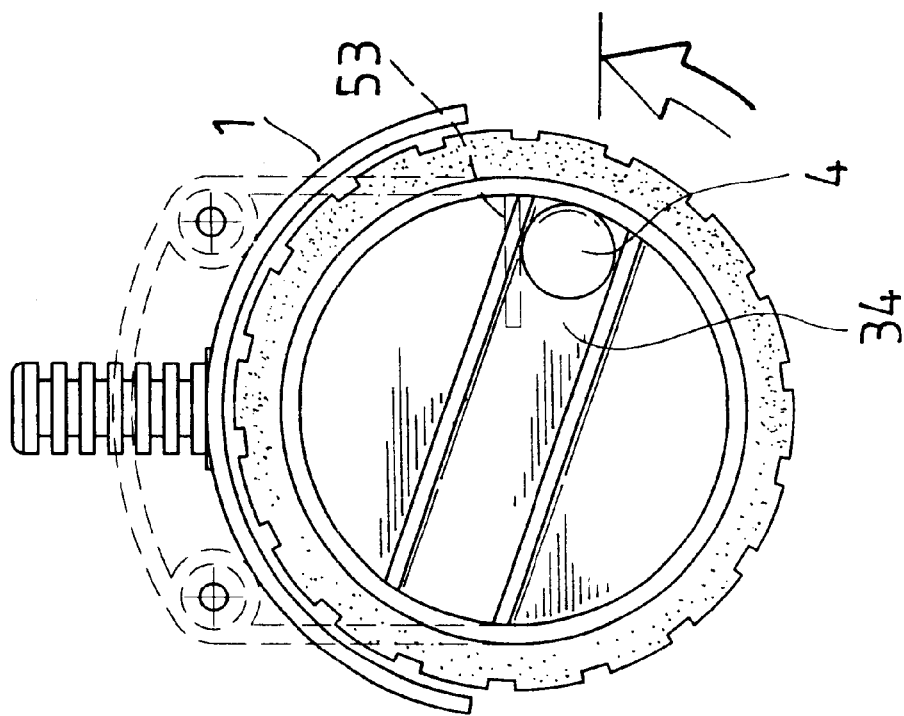
FIG. 6 is a view of the safety wheel of the present invention in forward rolling at high speed.

Referring to FIG. 6, when the wheel parts 2 and 3 roll at high speed, the ball 4 will be kept at an original end portion of the elongated trench 34 due to centrifugal force; thus, the ball 4 will be stopped by the stopping part 53 of the side cover 5, and the wheel will be stopped from rolling.

Figure 7:
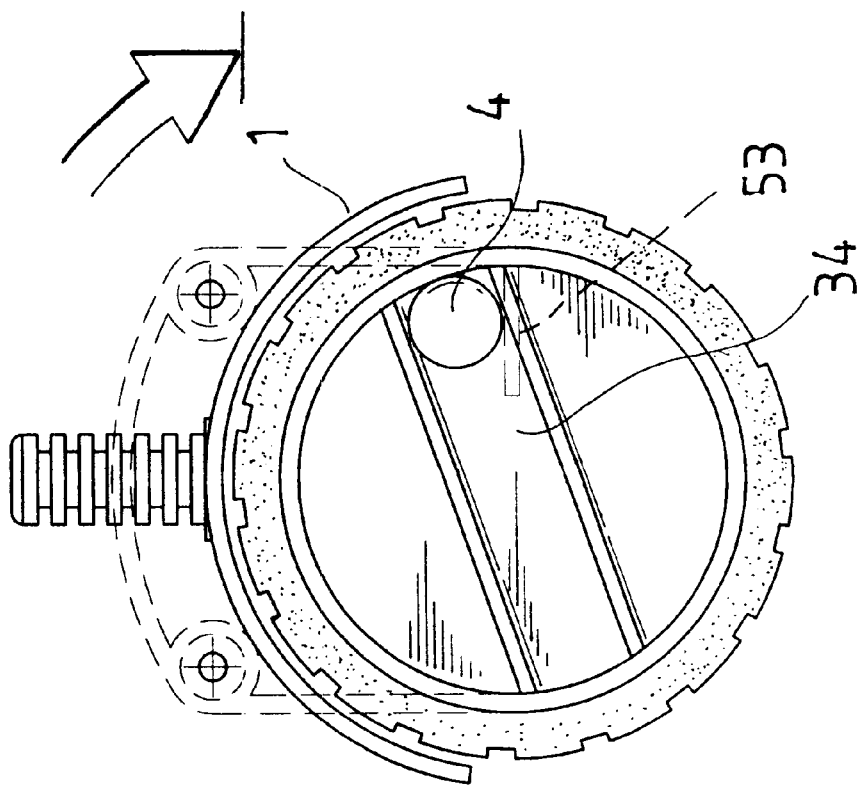
FIG. 7 is a view of the safety wheel of the present invention in backward rolling.
Figure 8:
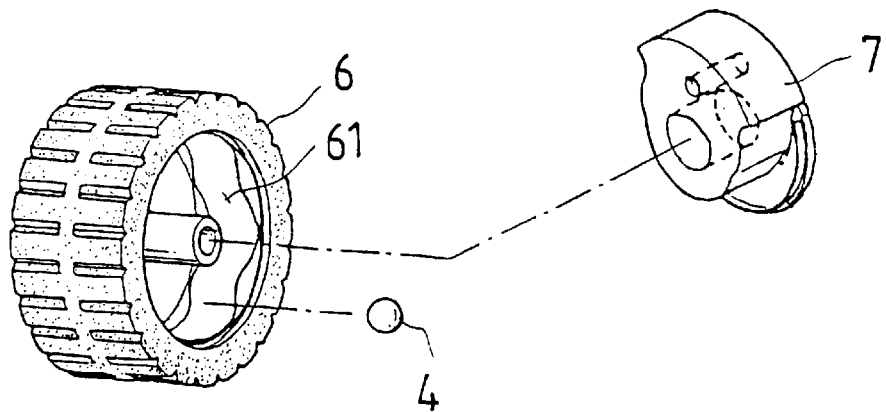
FIG. 8 is an exploded perspective view of a conventional safety wheel as described in the Background.
Figure 9:
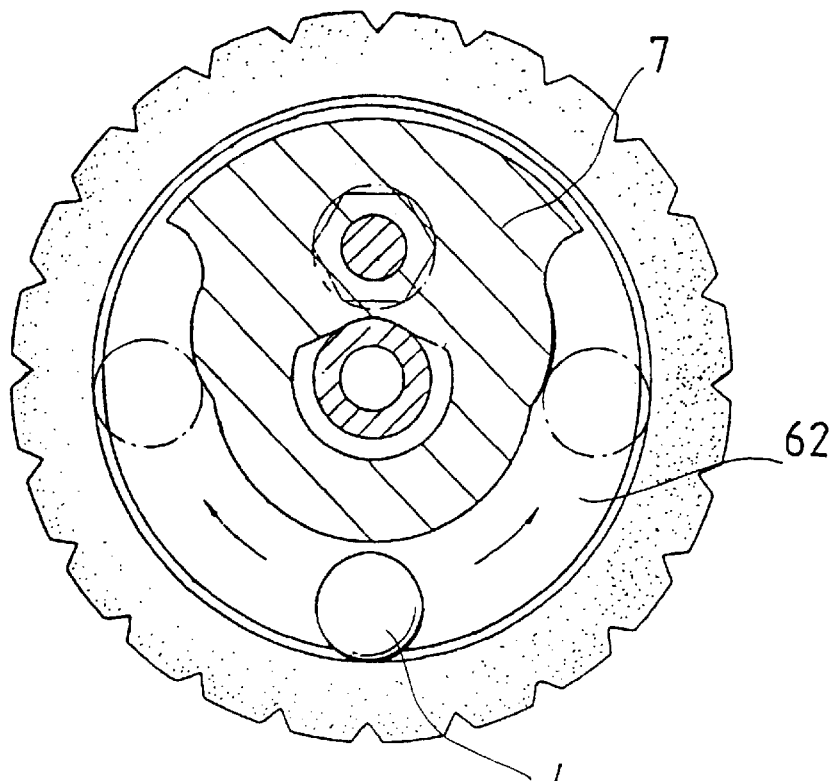
FIG. 9 is a cross-sectional view of the safety wheel in FIG. 8.

Referring to FIG. 7, when the wheel parts 2 and 3 roll backwards, the ball 4 will move to a lower end portion of the elongated trench 34 due to gravity; thus, the ball 4 will be stopped by the stopping part: 53, and the wheel sill be stopped from rolling. So, the wheeled chair can't move backwards because of the safety wheel.

From the above description, the safety wheel of the present invention can be known to have desirable features as follows:

1. Because the wheeled chair can only move forwards, the baby on the wheeled chair can have a safer riding 2. When the wheeled chair moves, the ball will hit the wheel part, and make noise for permitting the parents find out where the baby is by the noise.

What is claimed is:

1. A safety wheel of a baby's wheeled chair, comprising:
   (a) a support member, said support member being connected to a lower side of said wheeled chair;
   (b) a right wheel part, said right wheel part being rotatably connected to said support member;
   (c) a left wheel part, said left wheel part being connected to said right wheel part, said left wheel part having an elongated confining trench formed thereacross;
   (d) a ball, said ball being movably received in said elongated confining trench; and,
   (e) a side cover, said side cover having a round recess and a stopping part formed in said round recess, said side cover being connected to said support member with said round recess facing said left wheel part, said ball being capable of moving to a lower end portion of said confining trench due to gravity and subsequently being stopped by said stopping part of said side cover when said wheel rolls in a first direction, and said ball not being stopped by said stopping part when said wheel rolls below a predetermined speed in a second direction, said second direction being opposite said first direction.

2. The safety wheel of a baby's wheeled chair as claimed in claim 1, wherein said right and said left wheel parts are made of rubber, and have tread designs on outer sides thereof.

* * * * *